L. H. BROOME.
FRICTION DEVICE.
APPLICATION FILED FEB. 19, 1906.
916,528.
Patented Mar. 30, 1909.
2 SHEETS—SHEET 1.
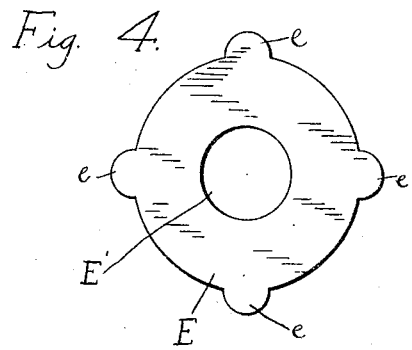
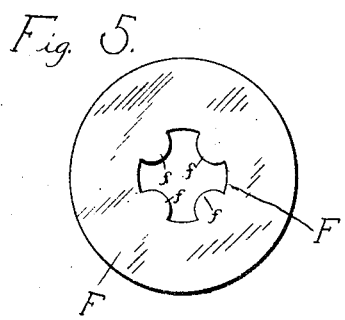
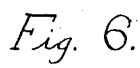
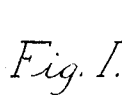
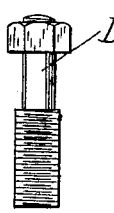
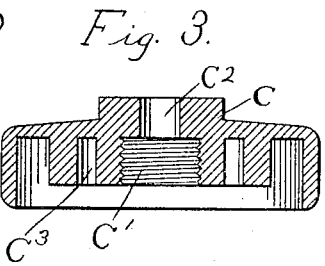
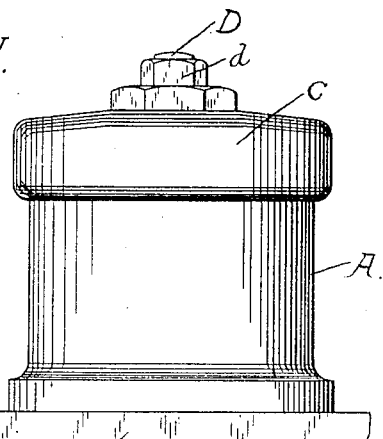
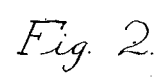
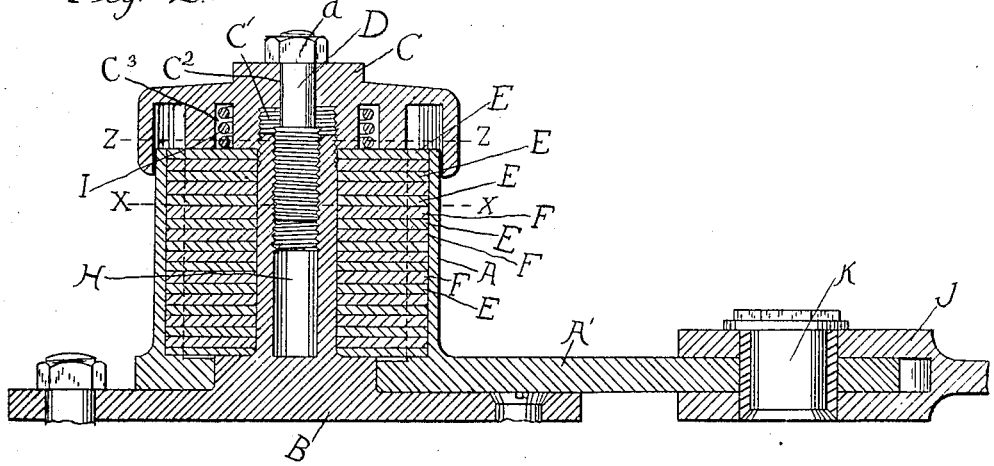
Witnesses
Arthur L. McNeil
Wm Bodge
Inventor
Lewis H. Broome
By his Attorney
Frank H. Ashley

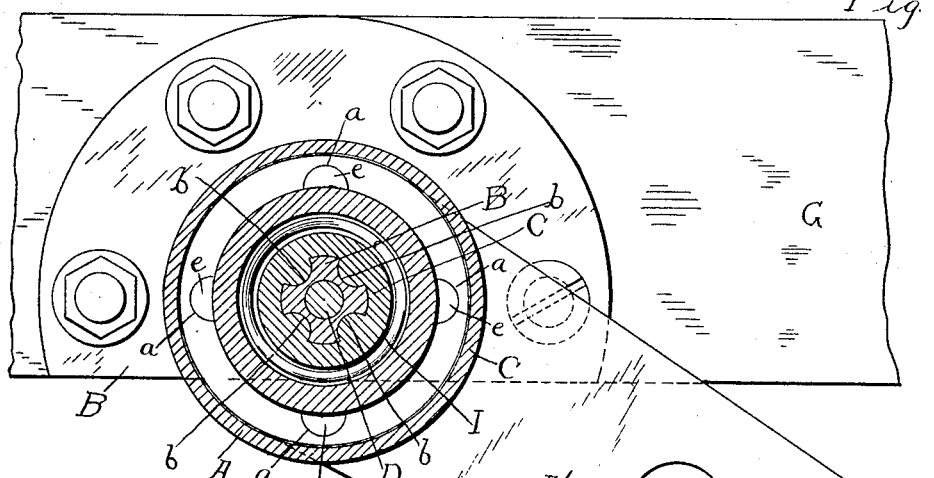
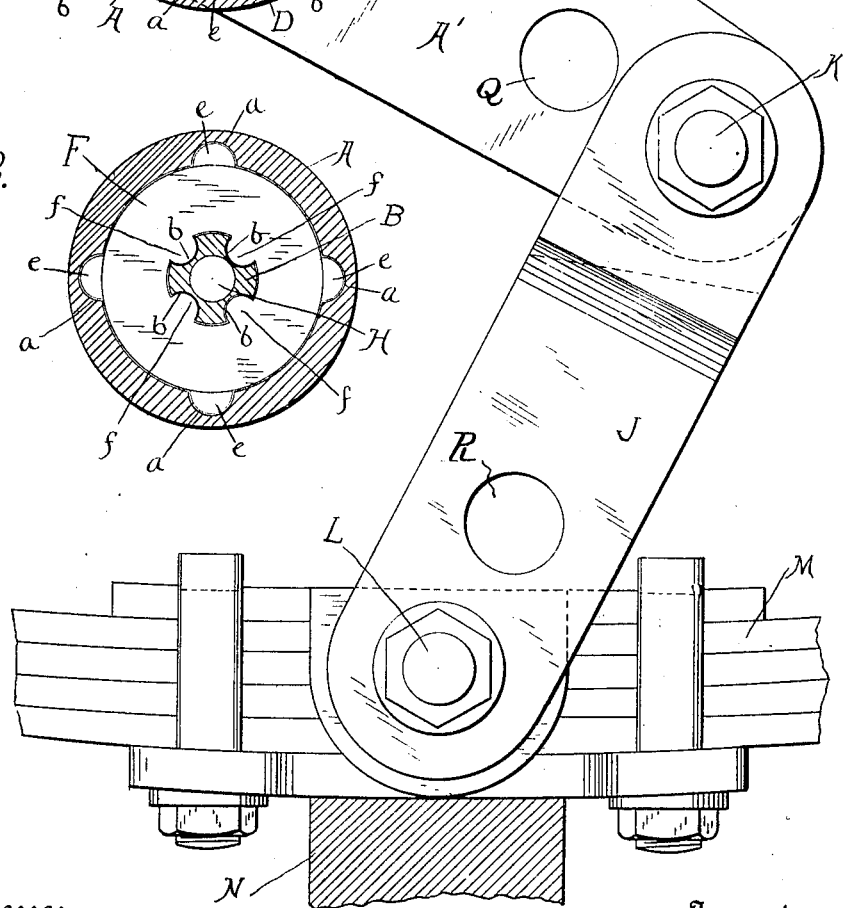

UNITED STATES PATENT OFFICE.

LEWIS H. BROOME, OF JERSEY CITY, NEW JERSEY.

FRICTION DEVICE.

No. 916,528.  Specification of Letters Patent.  Patented March 30, 1909.

Application filed February 19, 1906. Serial No. 301,749.

*To all whom it may concern:*

Be it known that I, LEWIS H. BROOME, a citizen of the United States, and resident of Jersey City, in the county of Hudson and State of New Jersey, have invented certain new and useful Improvements in Friction Devices, of which the following is a specification.

The present invention relates to friction devices of that class in which one member moves relative to another under a stress caused by intermediate frictional surfaces.

The object of the invention is to provide a device of this character, which will be simple in construction, durable, of very light weight and small dimensions relative to its capacity, and of convenient form for adaptation for use with various structures.

In the present drawings which form part of this specification, I show it combined with a shock absorber for use on automobiles, to illustrate how the device operates.

Referring to the drawings, Figure 1. is an exterior view of the casing of the device. Fig. 2. is a vertical sectional view of the same and disclosing the friction disks therein. Fig. 3. is a sectional view of the cap. Fig. 4. is a plan view of one of the friction disks and Fig. 5. is a plan view of another form of disk which is arranged in the casing alternately with the first named disk. Fig. 6. is an exterior view of the screw which is used as a gaging and locking means in adjusting the pressure between the disks. Fig. 7. is a cross sectional view of the cap of the casing taken on line Z—Z of Fig. 2, and illustrates its adaptation to a shock absorber when used on an automobile, and Fig. 8. is a cross sectional view of the casing on line X—X of Fig. 2, showing the disk illustrated in Fig. 5. in position in the casing.

A indicates the casing of the device which is made of any material suitable for the purpose, such as iron, brass, hard rubber, etc., depending upon the use to which the device is to be put. For the purpose illustrated I prefer iron or brass. In the present case the casing A is provided with a projecting member A' located at its base, but this member may be connected to any part of the casing to adapt it to any particular use; it is also provided with one or more vertical grooves $a$—$a$—$a$—$a$, see Fig. 8. which extend the entire length of the casing here shown, and these grooves are spaced apart at equal distances, where more than one is used, and the elements in the form of disks E—E—E, etc., are provided with projections $e$—$e$—$e$—$e$ etc., the number depending on the number in the casing, which in turn depends on the size of the casing and the use to which it is to be put, the projections $e$—$e$—$e$—$e$ fitting in the grooves $a$—$a$—$a$—$a$.

The disks E are provided with a circular opening E' to allow the said disks to slip over the upper end of the core piece B, the bottom of which forms a flange, as shown in Fig. 7 by means of which the device is fastened to the frame G of the automobile. The outer periphery of the disks F form an unbroken circle but the disk is provided with an opening F' into which the projections $f$—$f$—$f$—$f$ enter, and these projections are adapted to fit into corresponding grooves formed in the sides of the core piece B and indicated by $b$—$b$—$b$—$b$. The upper end of the core piece B is formed with a cylindrical bore H which is threaded with a left hand thread into which the lower end of the screw D fits, and the outer upper end of the core piece B is provided with a right hand thread which engages with the thread C' formed in the cap C. The cap C is also provided with a circular opening $C^2$ through which the top end of the screw D passes, and the screw D is provided with a nut $d$, which after it is adjusted is permanently fastened to the screw D. The screw D is not fitted tight in the cap C but has a certain amount of travel up and down in the cap C for a purpose hereinafter described. The cap C is further provided with an annular groove $C^3$ in which is located a helical spring I, which abuts the under side of the cap C at one end and the top of the upper disk at its lower end, and by screwing the cap C up or down on the core piece B, a corresponding pressure will be exerted upon the pile of disks, which are arranged one above the other, the disks E and F alternating and their respective projections engaging with the wall of the casing and the core piece B respectively.

It will be plain to those skilled in the art, that if pressure is applied to the top of the pile of disks by means of the cap C, the disks will be pressed together, and since each alternate disk is held by the casing and core piece respectively, the disks F and E must move relative to each other in opposite directions, and therefore it follows that the greater the pressure between the surfaces of the disks, the greater the friction will be between them and the harder it will be to move the core piece relative to the casing. Now the friction may be increased by adding more disks or by increasing their diameter or by adding more pressure or by combining any or all of the above means. By the use of the spring I, the pressure may be very minutely graduated and the friction correspondingly governed.

As before stated, the screw D has a certain longitudinal movement through the cap C, which movement is governed by the distance between the under side of the nut $d$ and the upper end of the threaded portion of the screw on the lower end of the screw D, and the thread being left handed, it is evident that it will screw into the core B when turned in one direction which would screw the cap in the opposite direction if rotated on its right hand thread in the same direction. This arrangement provides a means for preventing the cap from unscrewing from the core B, since the pitch of the threads on the core B and cap C are also different, and what would tend to unscrew one would tighten the other. Now in assembling these parts, the screw D is screwed into the core piece B until the cap thread C' starts to screw on the end of the core piece, when the cap is screwed on the core as far as the movement provided for it to travel over the end of the screw D, and when this limit is reached, the screw D is screwed forward again to the limiting distance, and when the cap is again turned, until the spring I is depressed to the desired degree, when by screwing down the screw D until the nut $d$ locks on the top of the cap, the whole is firmly secured and cannot unscrew accidentally. Where very great friction is required between the disks, the spring I may be dispensed with and the top of the cap is screwed directly on the disks to the desired degree.

The device may be changed in its form and the casing used as a pulley if desired where it is necessary to entirely revolve the casing around the core in use, without departing from the scope of my invention, which consists primarily in arranging a number of surfaces in contact in such a manner that they must move in opposite directions to each other, and means for controlling the degree of pressure between the surfaces.

One of the uses to which the device is adapted is shown and the operation is as follows:—The arm A' is connected to the arm J by a pivot K, and the arm J is connected to the base of the spring and axle of the vehicle by a pivot L. G is the frame of the vehicle which is supported by the spring M at its ends, which are not shown, but will be easily understood by those skilled in the art.

Now when the vehicle travels over uneven ground, the body or frame G moves relative to the axle N, and in case of a sudden hard bounce, the friction between the disks prevent the shock which would otherwise follow, by taking up the same in moving relative to each other as the axle and frame are forced toward and apart from each other, as will be readily understood.

It will be noted by reference to Fig. 2, that a circular boss B, is presented between the core and its base flange, said boss being of larger diameter than the core. The opening in the inner end of the casing is of such dimensions that said casing snugly swivels on said boss with one face in direct contact with the base flange, the result being that the casing end and base flange largely contribute to the frictional function of the device. Openings Q, R, in the arms A', J, admit of varying their connection by shifting the pivot K, and thereby adapting the invention for application to vehicles where the distance between the connections such as that on the bar G, and points where the springs are connected, differ.

I do not wish to limit myself to the specific form shown but reserve to myself all forms which come fairly within the scope of the invention.

Having thus described my invention, what I claim as new and desire to secure by Letters Patent is,

1. In a friction device of the character described, the combination with a plurality of elements one parallel with the other and presenting juxtaposed friction surfaces, of means for preventing said elements from moving in the same direction relative to each other, and means adapted to exert either a yielding or a positive pressure on the elements.

2. In a friction device of the character described, the combination with a plurality of elements one parallel with the other and presenting juxtaposed friction surfaces, of means for preventing said elements from moving in the same direction relative to each other, an adjustable cap having a portion for positively bearing against the contiguous element, and a spring interposed between the cap and said contiguous element, the arrangement being such that the cap can be adjusted to exert either a yielding or a positive pressure on the elements.

3. In a friction device of the character described, the combination of a casing and a core relatively revoluble with respect to each other, a plurality of parallel disks within said casing and presenting juxtaposed friction surfaces, one of the disks being engaged with the casing and the other with the core, and means adapted to exert either a yielding or a positive pressure on said disks.

4. In a friction device of the character described, the combination of a casing and a threaded core relatively revoluble with respect to each other, a plurality of parallel disks within said casing and presenting juxtaposed friction surfaces, one of the disks being engaged with the casing and the other with the core, a cap adjustably engaged with the core threads and having a portion for positively bearing against the contiguous disk, and a spring interposed between said cap and said contiguous disk, the arrangement being such that the cap can be adjusted to exert either a yielding or a positive pressure on said disks.

5. In a friction device of the character described, the combination of a casing and a threaded core relatively revoluble with respect to each other, a plurality of parallel disks within said casing and presenting juxtaposed friction surfaces, one of the disks being engaged with the casing and the other with the core, a cap having concentric portions for positively bearing against the contiguous disk and forming an intermediate annular space, the inner bearing portion of the cap being threaded to engage the core threads for the adjustment of the cap, and a spring located within said annular space and bearing against the contiguous disk, the arrangement being such that the cap can be adjusted to exert either a yielding or a positive pressure on said disks.

6. In a friction device of the character described, the combination of a casing and a threaded core relatively revoluble with respect to each other, a plurality of parallel disks within the casing and presenting juxtaposed friction surfaces, one of the disks being engaged with the casing and the other with the core, a cap closing the casing and adjustably engaged with the core threads, a spring subject to compression by the cap and bearing against the contiguous disk, and means for preventing the accidental unscrewing of the cap.

7. In a friction device of the character described, the combination of a casing and a threaded core relatively revoluble with respect to each other, a plurality of parallel disks within the casing and presenting juxtaposed friction surfaces, one of the disks being engaged with the casing and the other with the core, a cap adjustably engaged with the core threads and having a portion for positively bearing against the contiguous disk, a spring interposed between said cap and contiguous disk and subject to compression by the cap, and means for preventing the accidental unscrewing of the cap.

8. In a friction device of the character described, the combination of relatively fixed and revoluble parts presenting a casing and a core, a plurality of parallel disks within the casing and having juxtaposed friction surfaces, one of said disks being engaged with the casing and the other with the core, a cap adjustably engaged with one of said parts to close the casing, and a spring subject to adjustable compression by the cap and bearing against the contiguous disk.

9. In a friction device of the character described, the combination with a core having a base flange, of a casing bearing at one end against said base flange, said core and casing being relatively revoluble with respect to each other, a plurality of parallel disks within the casing and presenting juxtaposed friction surfaces, one of the disks being engaged with the casing and the other with the core, and means for exerting either a yielding or a positive pressure on said disks and casing end, against the base flange.

10. In a friction device of the character described, the combination with a core having a base flange, of a casing bearing at one end against said flange, said core and casing being relatively revoluble with respect to each other, a plurality of parallel disks within the casing and presenting juxtaposed friction surfaces, one of the disks engaged with the casing and the other with the core, an adjustable cap having a portion for positively bearing against the contiguous disk, and a spring interposed between the cap and said contiguous disk, the arrangement being such that the cap can be adjusted to exert either a yielding or a positive pressure on the disks and casing end against the base flange.

11. In a friction device of the character described, the combination with a threaded core having a base flange, of a casing bearing at one end against said flange, said core and casing being relatively revoluble with respect to each other, a plurality of parallel disks within the casing and presenting juxtaposed friction surfaces, one of the disks being engaged with the casing and the other with the core, a cap having concentric portions for positively bearing against the contiguous disk and forming an intermediate annular space, the inner bearing portion of the cap being threaded to engage the core threads for the adjustment of the cap, and a spring located within said annular space and bearing against the contiguous disk, the arrangement being such that the cap can be adjusted to exert either a yielding or a positive pressure on the disks and casing end against the base flange.

12. In a friction device of the character described, the combination with a threaded core having a base flange, of a casing bearing at one end against said flange, said core and casing being relatively revoluble with respect to each other, a plurality of parallel disks within the casing and presenting juxtaposed friction surfaces, one of the disks being engaged with the casing and the other with the core, a cap adjustably engaged with the core threads and having a portion for positively bearing against the contiguous disk, a spring interposed between the cap and said contiguous disk, and means for preventing the accidental unscrewing of the cap.

13. The combination with a friction device, comprising relatively fixed and revoluble parts, the fixed part adapted for securement to the body of a vehicle and the revoluble part having a projecting arm containing a plurality of perforations, of a second arm containing a plurality of perforations and pivoted at one end to the first mentioned arm, and at the other end to a connection with the vehicle running gear.

14. A casing provided with a number of grooves, a core piece provided with a number of grooves, a series of plates, some of which have projections which enter the grooves in the casing and some of which have projections which enter the grooves in the core piece, one of each of said plates connected to said casing being connected in frictional engagement with one of said disks connected to said core piece, a cap, a thread on said cap adapted to connect said cap to said core piece when turned in one direction, a screw, and a thread on said screw adapted to screw into said core piece when turned in an opposite direction to that in which the cap is turned, for the purpose set forth.

15. In a device of the character described, a casing, a core piece, a cap, a screw, a thread on said cap, said thread adapted to engage the exterior surface of the end of said core piece when turned in one direction, a thread on said screw adapted to screw into said core piece when turned in the opposite direction to that in which the cap is turned when being screwed on said core piece, the thread on the cap and thread on the screw being of different pitches, for the purpose set forth.

16. A casing provided with a number of grooves, a core provided with a number of grooves, a series of disks, some of which have projections which enter the grooves in the casing, and some of which have projections which enter the grooves in the core, each disk connected to the casing being connected in frictional engagement with one of said disks engaged with the core, a cap having a thread thereon adapted to connect the cap to the core when turned in one direction, a screw having a thread thereon adapted to screw into said core, when turned in a direction opposite to that in which the cap is turned, a projecting member connected to said casing, a pivoted link connected to said member, and means for securing the core to the body of a vehicle and the end of the link to the running gear.

17. In a friction device of the character described, the combination of relatively fixed and revoluble parts presenting a casing and a core, a plurality of parallel disks within the casing and having juxtaposed friction surfaces, one of said disks being engaged with the casing and the other with the core, a cap adjustably engaged with one of said parts to close the casing, a spring subject to adjustable compression by the cap and bearing against the contiguous disk, and means for preventing the accidental unscrewing of the cap.

Signed at New York in the county of New York and State of New York this 17th day of February A. D. 1906.

LEWIS H. BROOME.

Witnesses:
FRANK M. ASHLEY,
ARTHUR L. McNEIL.